United States Patent [19]
Wistuba et al.

[11] Patent Number: 5,659,589
[45] Date of Patent: Aug. 19, 1997

[54] DEVICE FOR COLLECTING AND COOLING REACTOR-MELTDOWN PRODUCTS

[75] Inventors: Lothar Wistuba, Herzogenaurach; Gerhard Hau, Albstadt, both of Germany

[73] Assignee: Siemens Aktiengesellschaft, Munich, Germany

[21] Appl. No.: 580,285

[22] Filed: Dec. 27, 1995

Related U.S. Application Data

[63] Continuation of PCT/DE94/00701, Jun. 20, 1994 published as WO95/01640, Jan. 12, 1995.

[30] Foreign Application Priority Data

Jul. 2, 1993 [DE] Germany .................. 43 22 107.6

[51] Int. Cl.⁶ ........................................ G21C 9/016
[52] U.S. Cl. ................................................ 376/280
[58] Field of Search .................. 376/280; 976/DIG. 143

[56] References Cited

U.S. PATENT DOCUMENTS

| H91 | 7/1986 | Gabor et al. | 376/280 |
|---|---|---|---|
| 3,607,630 | 9/1971 | West et al. | 376/280 |
| 3,930,939 | 1/1976 | Bittermann et al. | 376/280 |
| 4,584,802 | 4/1986 | Casselman et al. | 376/280 |
| 4,978,496 | 12/1990 | Dumas et al. | 376/280 |
| 5,192,494 | 3/1993 | Becker et al. | 376/280 |
| 5,343,506 | 8/1994 | Artnik et al. | 376/280 |
| 5,402,456 | 3/1995 | Schabert et al. | 376/280 |

FOREIGN PATENT DOCUMENTS

| 2193233 | 2/1974 | France . | |
|---|---|---|---|
| 2616578 | 12/1988 | France . | |
| 2925680 | 10/1980 | Germany . | |
| 2030347 | 4/1980 | United Kingdom . | |
| 2052133 | 1/1981 | United Kingdom | 376/280 |
| 90/10936 | 9/1990 | WIPO . | |
| 92/11642 | 7/1992 | WIPO . | |

*Primary Examiner*—Daniel D. Wasil
*Attorney, Agent, or Firm*—Herbert L. Lerner; Laurence A. Greenberg

[57] ABSTRACT

A device for collecting reactor-meltdown products from a reactor pressure vessel includes an expansion chamber for receiving the reactor-meltdown products and for receiving a coolant, such as cooling water, for cooling the reactor-meltdown products spreading in the expansion chamber. The expansion chamber is disposed laterally of the reactor pressure vessel and has a floor and a cooling system in the floor.

26 Claims, 5 Drawing Sheets

DEVICE FOR COLLECTING AND COOLING REACTOR-MELTDOWN PRODUCTS

CROSS-REFERENCE TO RELATED APPLICATION

This application is a continuation of International Application Serial No. PCT/DE94/00701, filed Jun. 20, 1994, published as WO95/01640, Jan. 12, 1995.

BACKGROUND OF THE INVENTION

Field of the Invention

The invention relates to a device for collecting and cooling a reactor melt or reactor-meltdown products from a reactor pressure vessel, having an expansion chamber in which the spreading reactor-meltdown products can be cooled with the aid of a coolant, such as cooling water.

The device is usable particularly in the EPR pressurized water reactor.

In nuclear reactors, safety considerations so far have assumed that failure of the reactor pressure vessel need not be feared, because of the choice of material and the dimensions. Recently, however, in the course of more-intensive safety investigations of nuclear energy utilization, the situation in which a reactor pressure vessel "fails", however unlikely that may be, has also been studied. In particular a new reactor type, the European pressurized water reactor EPR, has been based on such considerations (see the publication entitled: VGB Kraftwerkstechnik 73 (1993), No. 2, pages 97–101). In contrast to the safety philosophy followed heretofore, in that reactor type a nuclear meltdown accident, a so-called MCA (Maximum Credible Accident), is not flatly excluded as a possibility. Investigations have also been made as to whether or not steam explosions might occur during a core meltdown, and whether or not the water vapor suddenly produced in such a critical phase might not cause the pressure vessel to collapse. There is no question that such accidents, however theoretical they might be, must be made controllable.

In a hypothetical serious accident in a nuclear power plant with a water-cooled reactor, it is accordingly assumed that the reactor core will melt. Subsequently, reactor-meltdown products would escape from the bottom of the reactor pressure vessel into the shielding pit of the reactor containment. In order to enable controlling such an accident, suitable structural provisions must be made to prevent the meltdown products, possibly escaping at excess pressure from the reactor pressure vessel and collecting in the region of the bottom of the nuclear reactor plant, from causing failure of the containment.

A nuclear reactor plant that is known from German Patent DE-PS 28 40 086, corresponding to UK Patent Application GB 2 030 347 A, for instance, has a collecting device for a reactor core that is melting down. A vertical drain channel is provided below the shielding pit surrounding the reactor pressure vessel. That drain channel passes through the containment and leads into a meltdown pit disposed below the containment. There the reactor-meltdown products emerging from the reactor pressure vessel are distributed over an absorber bed formed by a steel tub filled with water-free materials. After the steel tub melts, the meltdown products reach the bottom of the meltdown pit. The bottom and the side walls of the meltdown pit are water-cooled, and thus the meltdown products gradually solidify.

In the nuclear reactor plant known from German Patent DE-PS 29 25 680, a collecting tub for receiving the meltdown products is also provided and is located below the level of the reactor foundation. The collecting tub is not located directly below the reactor core but rather is located next to it and is connected to the bottom of the reactor building through a chute that ends horizontally above the collecting tub.

A collecting device for reactor-meltdown products is known from FIG. 1 of a publication entitled: Emerging Nuclear Energy Systems 1989, Icenes 89, Karlsruhe, July 3–6, Proceedings of the Fifth International Conference on Emerging Nuclear Systems, pp. 19–24. In that device, a cooled collecting tub is disposed inside the containment directly beneath the reactor pressure vessel, and in that tub the meltdown products spread out over a large area and can cool down in direct contact with water.

Published European Patent Application 0 392 604 A1 discloses a collecting and cooling device in which a water inlet is located beneath the reactor pressure vessel. In the case of a meltdown, the reactor-meltdown products and portions of the reactor pressure vessel and its built-in fixtures would drop directly into the water bath. From the standpoint of effective cooling and the aversion of steam explosions, that is not expedient. What is sought is instead a cooling process in which the outflowing reactor-meltdown products will not meet a relatively large quantity of water.

German Published, Non-Prosecuted Patent Application DE 43 22 107 A1, the priority of which is claimed in the instant application, discloses a device of the type referred to at the outset, and especially a core retention device operating on the expansion principle, in which in the event of failure of the reactor pressure vessel the forcefulness of steam production caused by contact between the reactor-meltdown products and any water that is present is considerably reduced or even averted entirely. That device is equipped with:

a) an antechamber disposed below the reactor pressure vessel, b) an expansion chamber for the reactor-meltdown products, c) a channel, between the antechamber and the expansion chamber, that is provided with a partition which can be destroyed by the reactor-meltdown products, and d) a coolant reservoir, which is connected to the expansion chamber through a closure element that can be destroyed by the reactor-meltdown products.

The expansion chamber in that case is dry under operating conditions.

Such a partition between the antechamber and the expansion chamber is also already shown in FIG. 4 of Published European Patent Application 0 563 739 A1 and B1, corresponding to U.S. Pat. No. 5,402,456. The partition includes a thin steel plate and it partitions off the outlet of the antechamber to a drain channel in the direction of the expansion chamber until it is destroyed by the heat of the meltdown products. The expansion chamber in that case is especially already filled with coolant when the reactor-meltdown products enter.

The device referred to at the outset relates to that European Patent Application, although it remains an open question whether the expansion chamber is dry or filled with water in the event of use. Currently, the EPR concept assumes that the expansion chamber is dry under operating conditions.

The invention is based on the concept that particular attention should be paid in construction to the floor of the expansion chamber, so that the reactor-meltdown products can be reliably caught in the expansion chamber and cooled there for a long time. A structure can be imagined in which the floor includes a protective or fireproof concrete, having a surface over which the reactor-meltdown products can spread, and in which beneath it a concrete base plate extending over the inner cross section of the containment is disposed. The usual containment liner, which also lines the walls of the containment, can then be located below this concrete base plate. A thick floor plate which again is formed of concrete in turn can be disposed below the concrete liner. Further investigations have shown that even with that kind of multilayered floor, special precautions against overheating must be made.

Initially, it must be remembered that in the case of failure where reactor-meltdown products occur, the containment liner that is intended to prevent the exporting of radioactivity to the atmosphere must not be allowed to become too hot. Another important factor is that the aforementioned protective or fireproof concrete and the concrete base plate should not assume an overly high temperature when reactor-meltdown products strike it, even after a relatively long time when the reactor-meltdown products are in the expansion chamber. Otherwise, as a consequence of decomposition, for instance of water bound chemically in the concrete, gases could form and escape, which under some circumstances would cause the protective concrete layer in the expansion chamber to be forced upward or lift off.

SUMMARY OF THE INVENTION

It is accordingly an object of the invention to provide a device for collecting and cooling reactor-meltdown products, which overcomes the hereinafore-mentioned disadvantages of the heretofore-known devices of this general type in such a way that a relatively low temperature can be attained in a region where reactor-meltdown products have escaped, or in other words at a floor of an expansion chamber.

With the foregoing and other objects in view there is provided, in accordance with the invention, a device for collecting reactor-meltdown products from a reactor pressure vessel, comprising an expansion chamber for receiving the reactor-meltdown products and for receiving a coolant, such as cooling water, for cooling the reactor-meltdown products spreading in the expansion chamber, the expansion chamber being disposed laterally of the reactor pressure vessel and having a floor and a cooling system in the floor.

With the aid of this cooling system, the reactor-meltdown products spreading over the expansion surface are accordingly additionally cooled from beneath. It is thus assured that the floor can be kept at a relatively low temperature. Computer-based studies have shown that with the aid of a coolant such as cooling water, and with a suitable choice of materials and appropriate geometries in the floor region, a temperature can be attained that is below 300° C.

In accordance with another feature of the invention, the cooling system can be supplied with the coolant from the expansion chamber. This coolant is already present there, at the latest in the event of a failure.

Further investigations have shown that the cooling system should preferably not include a system of pipes of round cross section. This is because in such a pipe system, difficulties could arise in removing steam from the individual tubes. That is, the steam could collect in the upper half of the tube cross section and because of the rounding it could only be carried away from there with difficulty.

In accordance with a further feature of the invention, the cooling system includes coolant channels having a cross section which is non-round.

In accordance with an added feature of the invention, the coolant channels have a cross section which is parallelepipedal or trapezoidal. With such cross sections, if outlet tubes mentioned below are used, relatively easy removal of the steam formed in the coolant channels can be attained.

In accordance with an additional feature of the invention, a first fundamental development is distinguished in that at least some of the coolant channels are each provided with one steam outlet tube, which discharges into the expansion chamber. With the aid of these steam outlet tubes, the steam from the coolant forming in the cooling system is drained into the expansion chamber.

In accordance with yet another feature of the invention, the steam outlet tube is provided with a protective casing, which is preferably conically constructed. This embodiment is based on the concept that the steam outlet tubes should have great resistance to the escaping reactor-meltdown products. That is assured above all whenever the base of the protective casing is larger than its top end, which is true for a conical embodiment.

In accordance with yet a further feature of the invention, a second fundamental further feature is distinguished in that at least some of the coolant channels communicate with a coolant entry line, which is disposed outside the expansion surface of the expansion chamber, and that these coolant channels are connected to a steam outlet line, which is likewise disposed outside the expansion surface of the expansion chamber. In this embodiment it is assured that the expansion surface is not interrupted by building structures, which lends it particular strength.

In accordance with yet an added feature of the invention, each of the steam outlet tubes has a covering at a location at which the steam outlet tube discharges into the expansion chamber.

In accordance with yet an additional feature of the invention, there is provided a coolant reservoir, a connecting line being connected to the coolant reservoir and discharging into the expansion chamber, and a closure element being disposed in the expansion chamber, closing the connecting line and being destructible by the reactor-meltdown products.

In accordance with again another feature of the invention, the coolant entry line has a mouth, the steam outlet line has an entrance, and including a guide baffle separating the mouth from the entrance in the floor.

In accordance with again a further feature of the invention, there are provided heat guide baffles disposed in the coolant channels.

In accordance with again an added feature of the invention, there are provided supporting strips, preferably concrete strips, having a non-round cross section and being disposed between the coolant channels.

In accordance with again an additional feature of the invention, the supporting strips have a parallelepipedal or a trapezoidal cross section.

In accordance with still another feature of the invention, the cooling system includes coolant channels being formed of sheet metal.

In accordance with still a further feature of the invention, there are provided reinforcement plates disposed in and crosswise to the longitudinal direction of the supporting strips.

In accordance with still an added feature of the invention, the cooling system includes coolant channels being constructed as lengthwise and crosswise conduits, the coolant channels being joined together in the floor.

In accordance with still an additional feature of the invention, the expansion chamber has an expansion surface, and there is provided a ring plenum surrounding the expansion surface in the floor, the coolant channels being connected to the ring plenum.

In accordance with a concomitant feature of the invention, the floor includes zirconium oxide ($ZrO_2$) stones and/or a layer of structural concrete.

Other features which are considered as characteristic for the invention are set forth in the appended claims.

Although the invention is illustrated and described herein as embodied in a device for collecting and cooling reactor-meltdown products, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
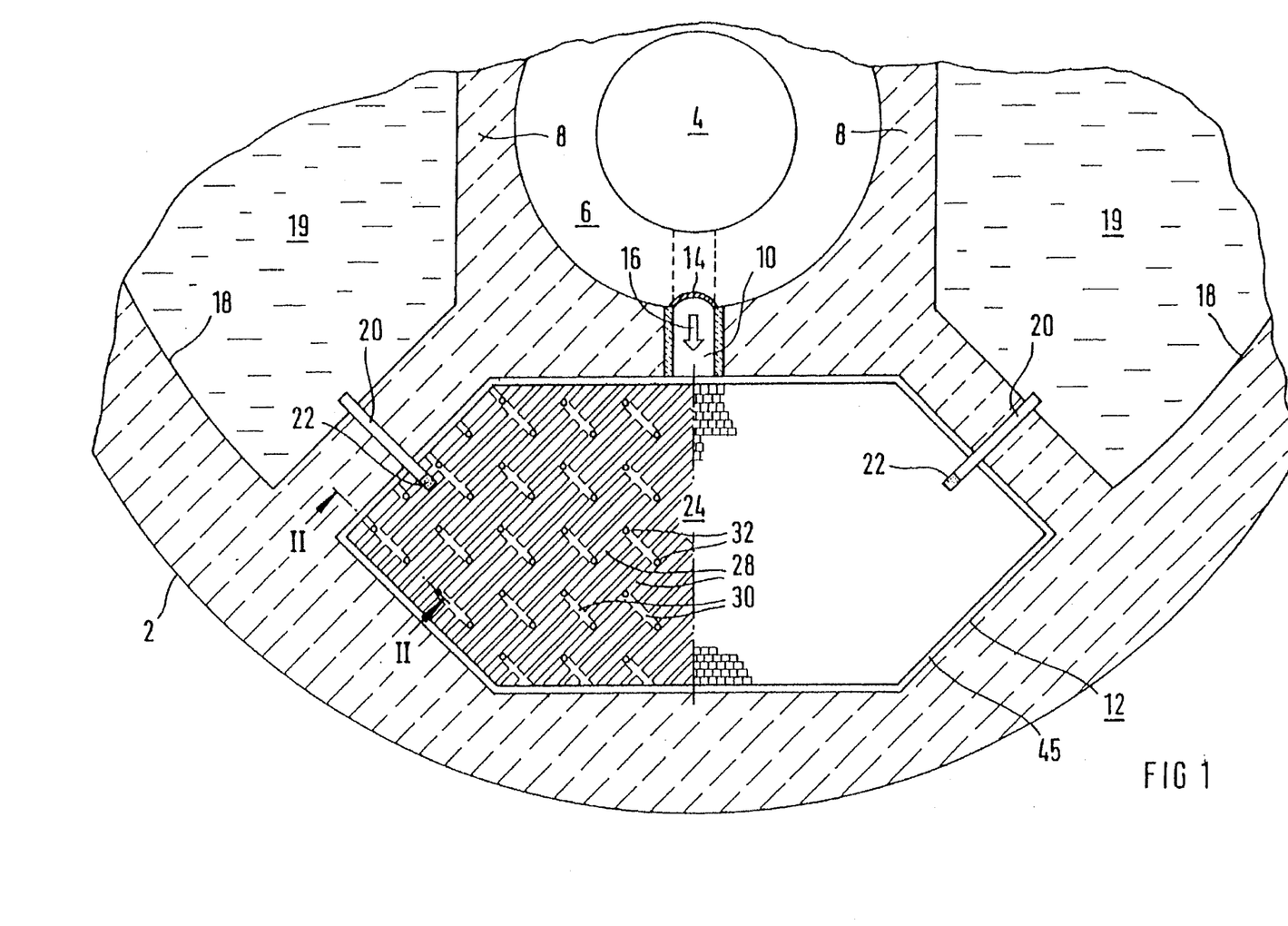
FIG. 1 is a fragmentary, diagrammatic, cross-sectional view taken from above onto a floor of an expansion chamber along a line I—I of FIG. 2, in the direction of the arrows, in accordance with a first fundamental further feature of the collecting and cooling device.

Referring now in detail to the figures of the drawing, in which the same reference numerals are used for identical and similar components, and first, particularly, to FIG. 1 thereof, there is seen a reactor pressure vessel 4 which is disposed in a reactor containment 2 of a nuclear plant. The reactor pressure vessel 4 is supported by a floor structure, surrounding it, in a reactor pit or shielding pit 6. A portion of a wall that surrounds the reactor pressure vessel 4 is shown as a supporting shield 8. A floor of the shielding pit 6 includes a fireproof protective layer, especially a fireproof concrete base. This floor prevents a reactor melt or reactor-meltdown products from being able to eat through it at the bottom. The reactor pressure vessel 4 may be cylindrical in an upper portion, for example, and it may have a spherical calotte in a lower portion. A theoretical accident scenario assumes that this spherical calotte can break open or break off, so that the reactor-meltdown products located in the reactor pressure vessel 4 pour into the shielding pit 6.

A lower portion of the shielding pit 6, in which the calotte of the reactor pressure vessel 4 is located, will be referred to below as an antechamber. If the calotte were to break off, it would drop into the antechamber. In order to ensure that in such a severe accident the escaping reactor-meltdown products would strike only a small volume of water if any, non-illustrated provisions are made so that the antechamber will have only a small volume beneath the reactor pressure vessel 4.

A channel, aperture or connection 10 of fireproof floor and wall material leads from the antechamber of the shielding pit 6, in which the reactor-meltdown products first arrive in the event of an accident, to a hexagonal expansion chamber 12. The hexagonal shape was chosen because if parallelepipedal stones of a predetermined geometry are used as a topmost floor covering, this shape is simple to make. In the present case what is important is that the expansion chamber 12 be disposed laterally and at some distance from reactor pressure vessel 4 and be kept dry in normal operation. The antechamber of the shielding pit 6 is accordingly connected to the expansion chamber 12 through the connection 10 with an outflow opening for the reactor-meltdown products 16 which are indicated by an arrow. The connection 10 may be constructed as a horizontal channel. Preferably, the connection 10 is inclined and drops down toward the expansion chamber 12. The floor of the connection 10 again includes a fireproof protective layer, which can extend on into the expansion chamber 12. A bulkhead or partition 14 that can be thermally destroyed by the reactor-meltdown products 16 is located in the connection 10. In other words, the bulkhead or partition 14 is dimensioned in such a way that after a predetermined time interval, it is destroyed under the influence of the reactor-meltdown products 16. In the present case, the bulkhead or partition 14 is constructed as a curved wall but it may also have some other construction.

The connection 10 has a round or rounded rectangular cross section, by way of example, and it has a height of 1.00 m and a width of 1.20 m, for instance. The thus-formed channel accordingly has a relatively large cross section, to enable an easy outflow of the reactor-meltdown products 16 once the partition 14 has been opened. A precipitous course of the connection 10 is preferred, to assure a largely residue-free outflow of the reactor-meltdown products 16 from the antechamber of the shielding pit 6 into the expansion chamber 12. The reactor-meltdown products 16 take the course of gravity. The area of the expansion chamber 12 is 150 $m^2$, for instance.

Provisions are preferably taken to assure that a coolant, such as cooling water 19, cannot flow into the expansion chamber 12 until the reactor-meltdown products 16 have already penetrated it in the direction indicated by the arrow. This procedure is called "dry expansion" in this case. However, it must be stressed that the partition 14 in this case is constructed in such a way that upon the outflow of the reactor-meltdown products 16 it will open reliably even if water, as a consequence of an accident, has entered the expansion chamber 12 and thus the danger of cooling of the partition 14 could actually exist, thus cancelling out the melt-through property thereof.

Figure 2:
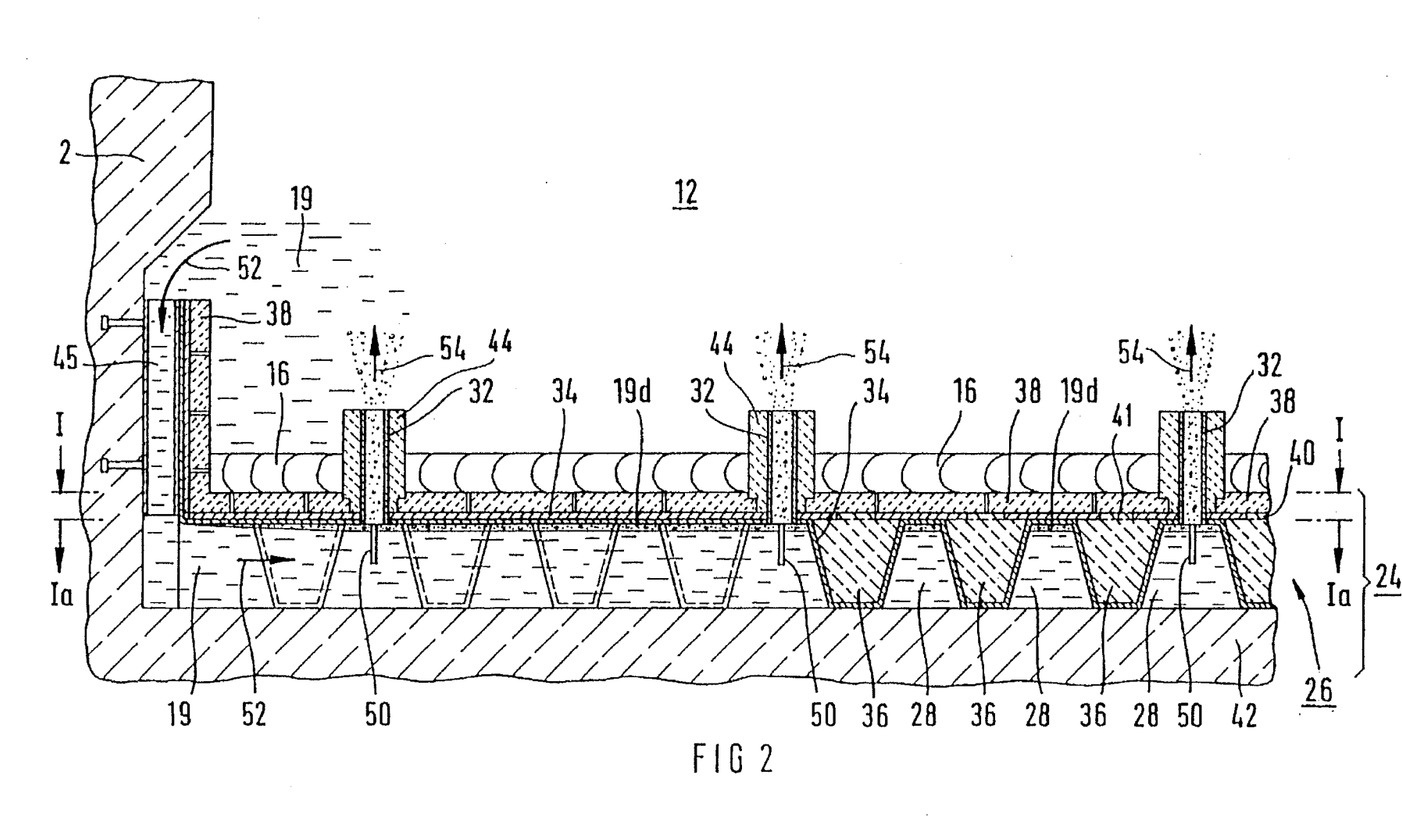
FIG. 2 is an enlarged, fragmentary, longitudinal-sectional view of an expansion chamber shown in FIG. 1, which is taken along a line II—II of FIG. 1, in the direction of the arrows.

When the reactor-meltdown products 16 arrive in the expansion chamber 12, coolant, especially cooling water 19, is automatically carried from a flood container or coolant reservoir 18 into the expansion chamber 12. To that end, there are connecting tubes 20 between the coolant reservoir 18 and the expansion chamber 12, which are each provided with a thermally destructible closure element 22, such as a plastic plug, inside the expansion chamber 12. In FIG. 2, the tubes 20 are not shown, for the sake of simplicity. The reservoir 18 in this case is in particular an internal flood container (IRWST) that is already present anyway.

The construction of a floor 24 of the expansion chamber 12 is of particular significance in this case. This floor 24 of the expansion chamber 12 contains a cooling system 26, as is indicated in FIG. 2, which is filled with this same coolant 19, at the latest after the entry of the coolant 19 from the flood container 18 into the expansion chamber 12, as will be described in further detail below in conjunction with FIGS. 1 and 2. This cooling system 26 includes a channel system, as can clearly be seen in FIG. 1 from the left-hand portion of the plan view onto the expansion chamber 12. Conversely, the right-hand portion of the expansion chamber 12 in FIG. 1 shows a plan view onto the stone layer located above it. For the sake of simplicity, steam outlet tubes 32 mentioned below are not shown therein. Accordingly, the right-hand portion of the expansion chamber 12 of FIG. 1 corresponds to a section line I—I of FIG. 2, and the left-hand portion of the expansion chamber 12, which is located at a greater depth in FIG. 1, corresponds to a section line Ia—Ia of FIG. 2.

The cooling system 26 includes a number of lengthwise channels 28 and a number of crosswise channels 30 at right angles thereto. The coolant channels 28, 30 are joined together in the floor 24. The coolant channels 28, 30 have a non-round cross section and it can be seen from FIG. 2 that they have a trapezoidal cross section. A parallelepipedal or other cross section is also possible. The steam outlet tubes 32 are provided at connecting terminal points of the lengthwise and cross channels 28, 30 and are located perpendicular to the plane of the paper in FIG. 1.

It can be seen from FIG. 2 that the cooling system 26 is formed with the aid of a metal plate 34. The metal plate 34 may, in particular, be an austenite plate, having a thickness of 4 mm, for instance. The trapezoidal lengthwise channels 28 and optionally similarly formed crosswise channels 30 are accordingly made with the aid of this plate 34. Support strips or support structures 36, which are constructed as concrete strips, are located beneath the various coolant channels 28, 30. These support strips 36 likewise have a non-round cross section and in this case they are shown with a trapezoidal cross section. The support strips 36 should be made of a fireproof material.

In the embodiment of FIG. 2, the floor 24 includes an "expansion surface" or top layer 38, which is especially fireproof because the reactor-meltdown products 16 spread over it, a bearing layer or expansion plate 40, the coolant channel system 26 having the coolant channels 28, 30 and the support strips 28 of fireproof concrete, and a lower support layer 42 of structural concrete. The layer 38 may, in particular, be zirconium oxide (ZrO$_2$) stones. The expansion plate 40 is preferably made up of partial plates that are placed next to one another, leaving expansion seams open. The coolant channels 28, 30 are all connected together to an annular gap or ring plenum 45, which is disposed on the outer periphery of the expansion chamber 12. The assembly of the cooling system 28 can proceed as follows: first, the undulating-shaped and especially trapezoidal metal plate floor structure, which is subdivided in accordance with assembly segments, is introduced. Then the individual assembly segments are welded together. Subsequently, the partial plates of the expansion plate 40 are mounted. Next, the steam outlet tubes 32 are mounted at selected points of the lengthwise and/or crosswise channels 28 and 30. Finally, "fill channels", which are widened at the top and are part of the metal-plate floor structure, are filled with fireproof concrete through recesses 41 formed in the expansion plate 40, thus producing the support strips 36.

The trapezoidal shape of the support strips 36 results in a favorable support of the loads located above them.

Figure 3:
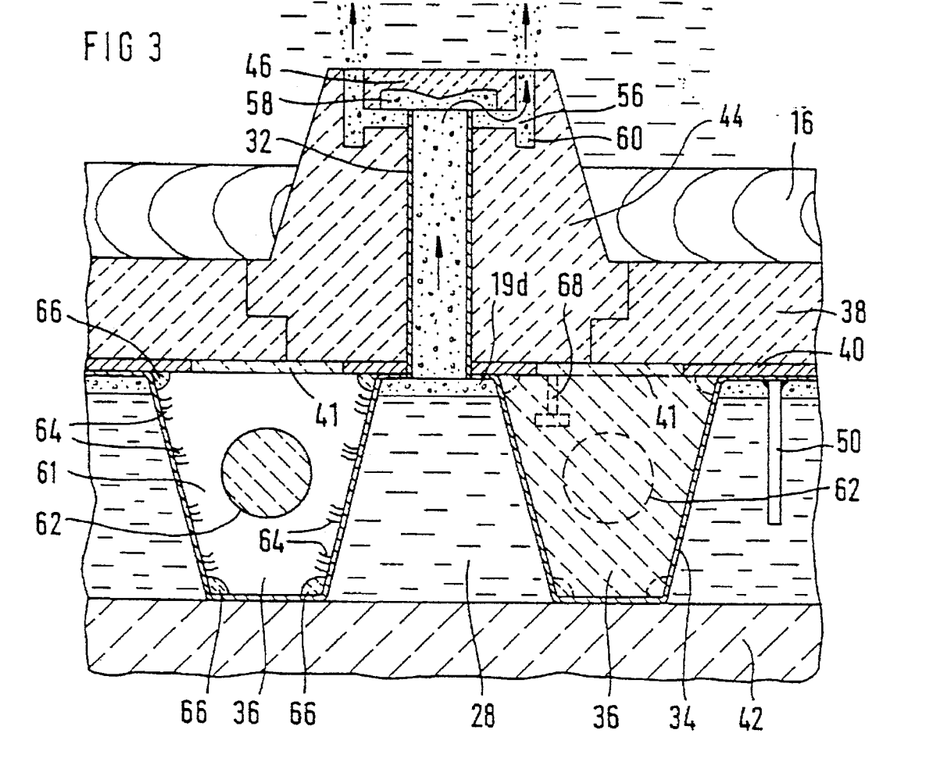
FIG. 3 is a further enlarged, fragmentary, longitudinal-sectional view of a further feature of the floor of an expansion chamber, which is taken along a line III—III of FIG. 4, in the direction of the arrows.

As already mentioned, at least some of the cooling channels 28, 30 are each provided with one upright steam outlet tube 32, having a mouth which protrudes some distance into the expansion chamber 12. These steam outlet tubes 32 serve to upwardly carry coolant steam 19d which collects at an upper end of the coolant channels 28, 30, into the expansion chamber 12. The mouths of the steam outlet tubes 32 are located some distance above the reactor-meltdown products 16. The various steam outlet tubes 32 are provided with a protective casing 44, which is cylindrically constructed in FIG. 2. The preferred conical form is shown in FIG. 3. The protective casing 44 serves to assure that the welded-in steam outlet tubes 32 will stand upright despite the entry of the reactor-meltdown products 16. FIG. 3 also shows that each steam outlet tube 32 is preferably produced with a cap or a protective covering 46 at its mouth in the expansion chamber 12 to guard against reactor-meltdown products as they fall in.

In FIG. 2, heat guide baffles 50 extending longitudinally of the channels 28, 30 are provided in the various coolant channels 28, 30. In FIG. 2, one must imagine these heat guide baffles 50 as being located beneath the plane of the paper. The heat guide baffles 50 are welded by their upper longitudinal edge to the austenite plate 34 and they extend to just before the region of the steam outlet tubes 32.

The following can be said about function: in unimpeded operation, both the expansion chamber 12 and the coolant channels 28, 30 are dry. In the event of an accident, the reactor-meltdown products 16 strike the expansion surface 38 of the expansion chamber 12 and spread out there. The closure elements 22 are melted open, so that cooling water 19 pours from the top out of the flood container 18 onto the reactor-meltdown products 16. The water 19 rises in the expansion chamber 12 and then passes downward through both the ring plenum 45 and the steam inlet tubes 32 into the channel system 28, 30. In this case it is available for cooling the floor 24. Coolant steam 19d can then form in the channel system 28, 30 and is carried away upward into the expansion chamber 12 through the steam outlet tubes 32. In this case it condenses or rises in the upper portion of the reactor containment 2. The course of the replenishing coolant 19 is represented by arrows 52 and the course of the steam is represented by arrows 54.

Figure 4:
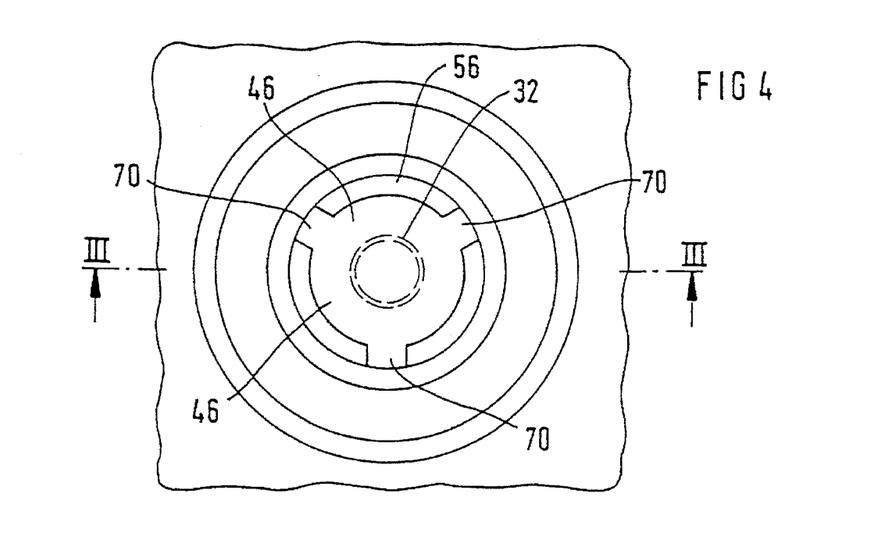
FIG. 4 is a fragmentary, top-plan view of the feature shown in FIG. 3.

In FIGS. 3 and 4, the steam outlet tubes 32 which are welded on their ends in the plate 34 of the coolant channel 28, are surrounded by a conical protective casing 44. This protective casing 44 may be formed of zirconium oxide, like the upper layer 38. A ring nozzle 56 is formed on the upper portion with the aid of the protective covering 46. To that end, this protective covering 46 has recesses 58 in a lower region thereof. A collecting ring 60 is preferably also provided in the lower region of the ring nozzle 56. The collecting ring serves to receive reactor-meltdown products 16 that may be falling in from above.

It can be seen from FIG. 3 that the expansion plate 40 has the recesses or openings 41 in the region of the conical support strips 36. The expansion plate 40 includes a number of expansion plate strips that are placed next to one another and are overlapping at the edges, thus forming non-illustrated expansion seams. Upon the arrival of reactor-meltdown products, or in other words upon a temperature rise, the expansion seams close. The openings 41 in the expansion plate 40 are dimensioned in such a way that a load from above is also transferred sideways to the concrete support strips 36.

It has already been noted that the support strips 36 are produced with the aid of the curved or bent plate 34. Ribs or reinforcement plates 61 can then be provided crosswise to the lengthwise direction in these support strips 36, as is shown for the support strip 36 on the left in FIG. 3. This reinforcement plate 61 has a central bore 62 formed therein. Concrete is located in front of and behind the reinforcement plate 61. The reinforcement plate 61 is secured to the plate 34 with the aid of weld locations 64. In order not to have to perform welding in the corners, recesses 66 are provided there. Concrete anchors 68 can be used to secure the support strips 36 to the expansion plate 40.

It can be seen from FIG. 4 that the protective covering 46 has three arms 70, at angles of 120° from one another. Through the use of these arms 70, the cap 46 can be secured centrally with a bayonet mount in the casing 44.

Figure 5:
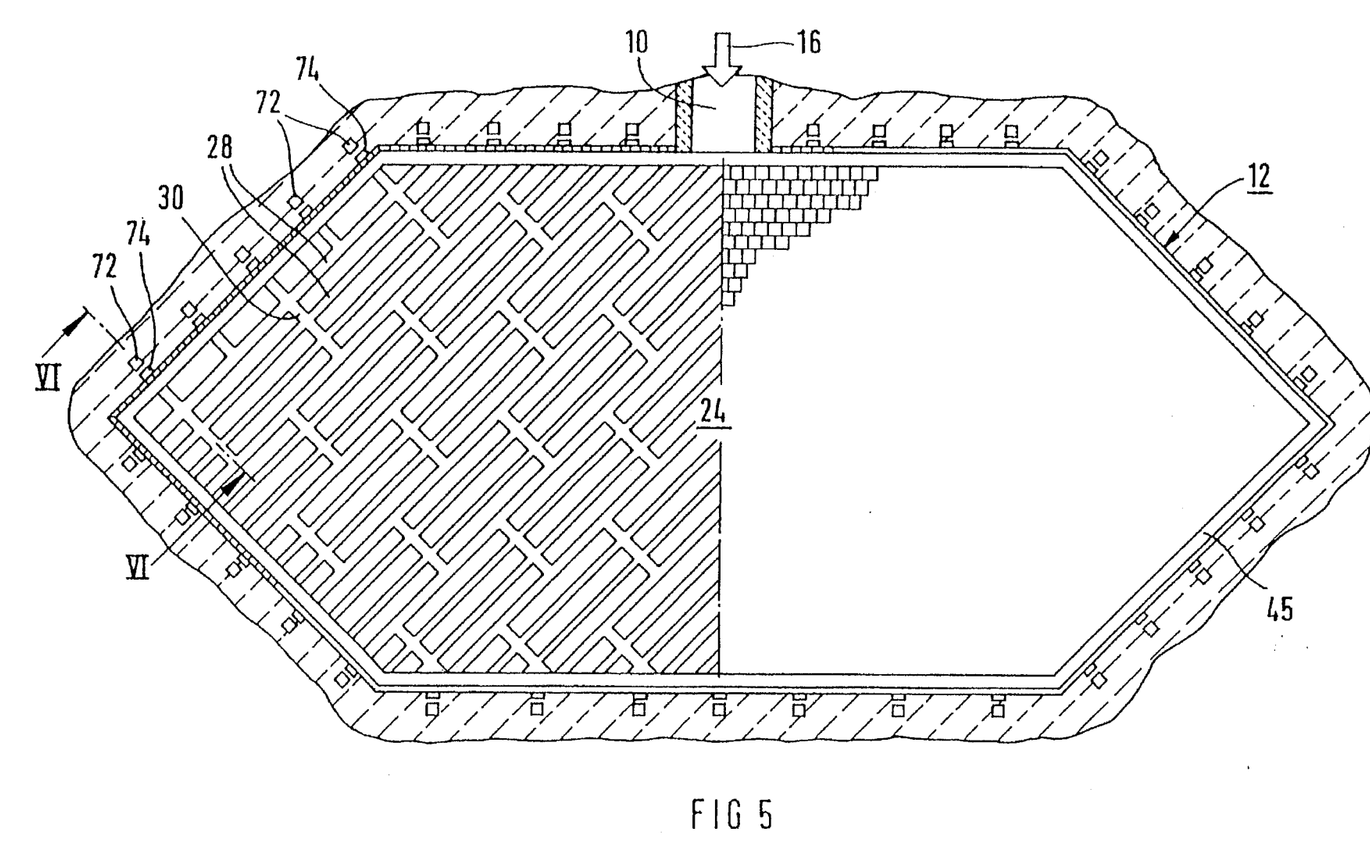
FIG. 5 is a fragmentary, top-plan view of the floor of an expansion chamber, in accordance with a second basic further feature of the collecting and cooling device.

FIG. 5 shows a view onto a hexagonal expansion chamber 12 as in FIG. 1. However, in this embodiment no steam outflow tubes 32 that pierce the floor 24 of the expansion chamber 12 are provided. Instead, some of the coolant channels 28, 30 communicate with a cooling water inlet line 72 that is disposed outside an expansion surface of the expansion chamber 12. The applicable coolant channels 28, 30 are also connected to a steam outlet line 74, which is likewise disposed outside the expansion surface of the expansion chamber 12. It can be seen from FIG. 5 that a large number of cooling water inlet lines 72 and steam outlet lines 74 are provided around the periphery. The lines 72, 74 are disposed in pairs in the front of the ring plenum 45.

Figure 6:
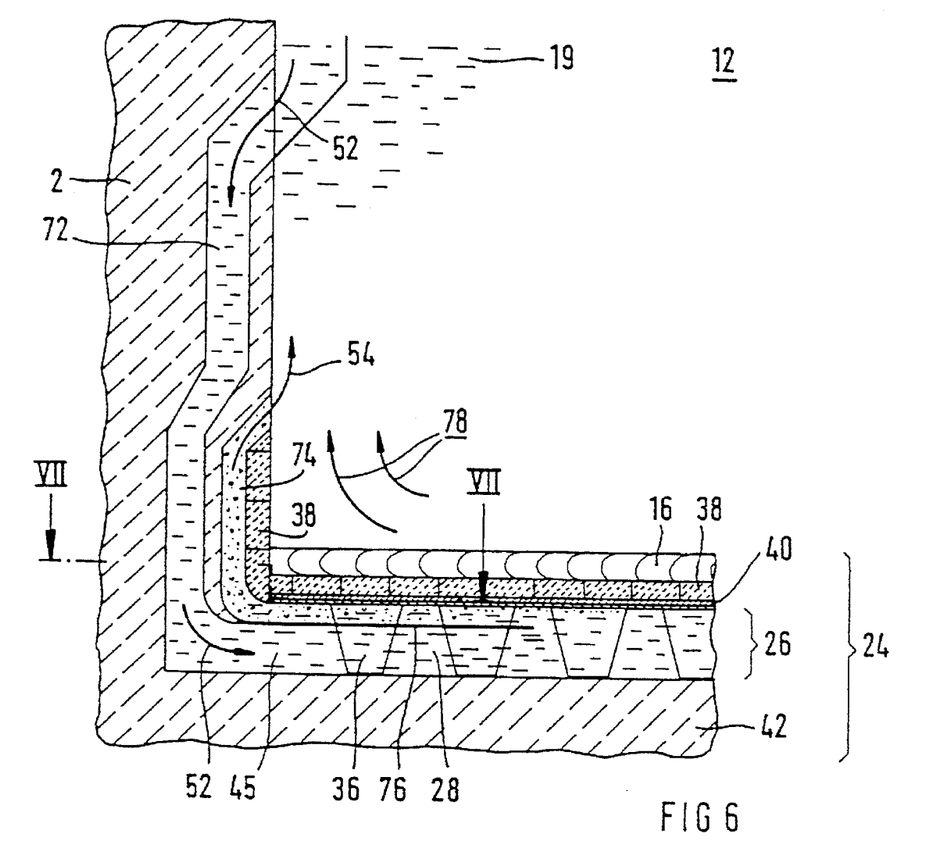
FIG. 6 is an enlarged, fragmentary, longitudinal-sectional view of the expansion chamber shown in FIG. 5, which is taken along a line VI—VI of FIG. 5, in the direction of the arrows.
Figure 7:
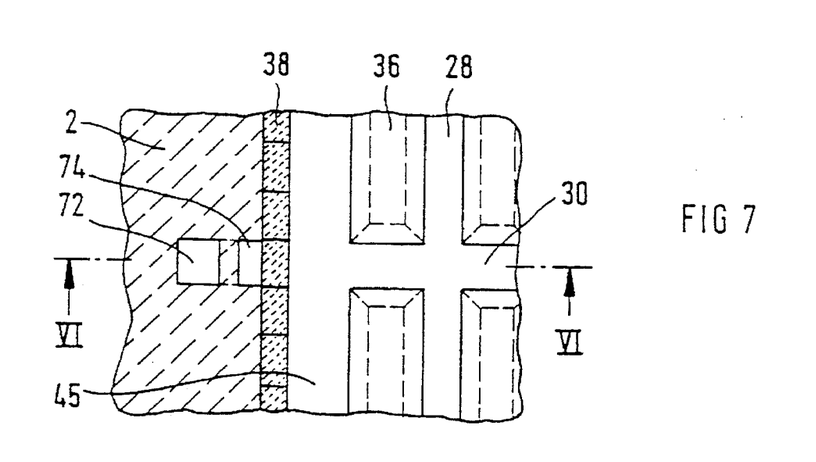
FIG. 7 is a cross-sectional view taken along a line VII—VII of FIG. 6, in the direction of the arrows.

It can be seen from FIGS. 6 and 7 that the cooling water inlet line 72 merges with a coolant channel 30. In the floor 24 of the expansion chamber 12, a mouth of the cooling water inlet line 72 is separated from the inlet into the steam outlet line 74 by a guide baffle 76. As a result, a two-phase mixture is prevented from forming at the entry of the cooling water. The entrance of cooling water is again indicated by flow arrows 52. The outflow of steam is similarly identified by a flow arrow 54. Other flow arrows 78 indicate that the coolant 19 is kept in circulation in the expansion chamber 12. This involves natural convection.

In the embodiment of FIGS. 5–7, the floor 24 is constructed in the same way as in the embodiments of FIGS. 1–4.

In this variant, the steam is thus received in a plenum entirely surrounding the expansion surface and is carried into the expansion chamber 12 through recessed concrete channels. The volumetric compensation for the outflowing steam is effected by the inflow of coolant water 19 from wall regions located higher up into the same plenum. From there, it passes into the various coolant channels 28, 30. The separation of steam and water is attained in the outflow region through the use of the guide baffle 76. Thus a steam flow that is largely unimpeded by the counterflowing coolant water 19 is attained.

We claim:

1. In a reactor having a reactor pressure vessel, a device for collecting reactor-meltdown products from the reactor pressure vessel, comprising:

an antechamber disposed below the reactor pressure vessel;

an expansion chamber for receiving the reactor-meltdown products and for receiving a coolant for cooling the reactor-meltdown products spreading in said expansion chamber, said expansion chamber being disposed laterally of, and at a distance from the reactor pressure vessel and having a floor and a cooling system in said floor; and said expansion chamber communicating with said antechamber.

2. The device according to claim 1, wherein the coolant is cooling water.

3. In a reactor having a reactor pressure vessel, a device for collecting reactor-meltdown products from the reactor pressure vessel, comprising:

an expansion chamber for receiving the reactor-meltdown products and for receiving a coolant for cooling the reactor-meltdown products spreading in said expansion chamber, said expansion chamber being disposed laterally of the reactor pressure vessel and having a floor and a cooling system in said floor, wherein said cooling system can be supplied with the coolant from said expansion chamber.

4. The device according to claim 1, wherein said cooling system includes coolant channels having a non-round cross section.

5. The device according to claim 4, wherein said coolant channels have a parallelepipedal cross section.

6. The device according to claim 4, wherein said coolant channels have a trapezoidal cross section.

7. The device according to claim 1, including a coolant reservoir, a connecting line being connected to said coolant reservoir and discharging into said expansion chamber, and a closure element being disposed in said expansion chamber, closing said connecting line and being destructible by the reactor-meltdown products.

8. In a reactor having a reactor pressure vessel, a device for collecting reactor-meltdown products from the reactor pressure vessel, comprising:

an expansion chamber for receiving the reactor-meltdown products and for receiving a coolant for cooling the reactor-meltdown products spreading in said expansion chamber, said expansion chamber being disposed laterally of the reactor pressure vessel and having a floor and a cooling system in said floor, wherein said cooling system includes coolant channels having a non-round cross section and at least some of said coolant channels are each provided with one respective steam outlet tube discharging into said expansion chamber.

9. The device according to claim 8, wherein each of said steam outlet tubes has a protective casing.

10. The device according to claim 9, wherein said protective casing is conical.

11. The device according to claim 8, wherein each of said steam outlet tubes has a covering at a location at which said steam outlet tube discharges into said expansion chamber.

12. The device according to claim 4, wherein said expansion chamber has an expansion surface, and including a coolant entry line and a steam outlet line both being disposed outside said expansion surface, at least some of said coolant channels communicating with said coolant entry line and being connected to said steam outlet line.

13. The device according to claim 12, wherein said coolant entry line has a mouth, said steam outlet line has an entrance, and including a guide baffle separating said mouth from said entrance in said floor.

14. The device according to claim 4, including heat guide baffles disposed in said coolant channels.

15. The device according to claim 4, including supporting strips having a non-round cross section and being disposed between said coolant channels.

16. The device according to claim 15, wherein said supporting strips are concrete strips.

17. The device according to claim 15, wherein said supporting strips have a parallelepipedal cross section.

18. The device according to claim 15, wherein said supporting strips have a trapezoidal cross section.

19. The device according to claim 1, wherein said cooling system includes coolant channels being formed of sheet metal.

20. The device according to claim 15, including reinforcement plates disposed in and crosswise to the longitudinal direction of said supporting strips.

21. The device according to claim 1, wherein said cooling system includes coolant channels being constructed as lengthwise and crosswise conduits, said coolant channels being joined together in said floor.

22. The device according to claim 4, wherein said expansion chamber has an expansion surface, and including a ring plenum surrounding said expansion surface in said floor, said coolant channels being connected to said ring plenum.

23. The device according to claim 1, wherein said floor includes zirconium oxide stones.

24. The device according to claim 1, wherein said floor includes a layer of structural concrete.

25. The device according to claim 1, wherein said floor includes zirconium oxide stones and a layer of structural concrete.

26. The device according to claim 1, wherein said expansion chamber communicates with said antechamber through one of a channel, aperture and connection extending therebetween.

* * * * *